US011464373B2

(12) United States Patent
Braun

(10) Patent No.: US 11,464,373 B2
(45) Date of Patent: Oct. 11, 2022

(54) SPLATTER SHIELD FOR TOILET

(71) Applicant: Sandra Braun, Lee's Summit, MO (US)

(72) Inventor: Sandra Braun, Lee's Summit, MO (US)

( * ) Notice: Subject to any disclaimer, the term of this patent is extended or adjusted under 35 U.S.C. 154(b) by 0 days.

(21) Appl. No.: 17/193,156

(22) Filed: Mar. 5, 2021

(65) Prior Publication Data

US 2021/0274986 A1    Sep. 9, 2021

Related U.S. Application Data

(60) Provisional application No. 62/986,268, filed on Mar. 6, 2020.

(51) Int. Cl.
*A47K 13/24* (2006.01)
*E03D 9/00* (2006.01)

(52) U.S. Cl.
CPC ............... *A47K 13/24* (2013.01); *E03D 9/00* (2013.01)

(58) Field of Classification Search
CPC ..................................... A47K 13/24
USPC .................................. 4/300.3, 415
See application file for complete search history.

(56) References Cited

U.S. PATENT DOCUMENTS

| | | | | |
|---|---|---|---|---|
| 4,348,776 A * | 9/1982 | Sarjeant | ................. | A47K 13/08 4/300.3 |
| 4,612,676 A * | 9/1986 | Whitman | ................. | E03D 13/00 4/300.3 |
| 4,912,784 A * | 4/1990 | Jacobson | ................. | E03D 9/00 222/192 |
| 5,077,840 A * | 1/1992 | Masters | ................. | A47K 13/08 4/300.3 |
| 5,216,760 A * | 6/1993 | Brown | ................. | A47K 13/08 4/245.4 |
| 5,276,925 A * | 1/1994 | Blaha | ................. | E03D 11/025 4/300.3 |
| 5,373,589 A * | 12/1994 | Rego | ................. | E03D 9/00 4/300.3 |
| 5,494,218 A * | 2/1996 | Armand | ................. | A47K 10/32 239/52 |
| 5,564,135 A * | 10/1996 | Jones | ................. | E03D 9/00 4/300.3 |
| 5,655,233 A * | 8/1997 | Lackey, Jr. | ................. | A47K 13/14 4/234 |
| 5,732,416 A * | 3/1998 | Albert | ................. | E03D 9/00 4/300.3 |
| 5,815,851 A * | 10/1998 | Perry | ................. | A47K 13/24 4/300.3 |
| 5,943,707 A * | 8/1999 | Bergenwall | ................. | E03D 9/08 4/300.3 |

(Continued)

*Primary Examiner* — Lori L Baker
(74) *Attorney, Agent, or Firm* — Hovey Williams LLP

(57) ABSTRACT

A splatter shield device for toilets, which is designed to solve the problem of waste splatter and/or overspray by containing and/or channeling waste back into the toilet bowl itself. The device generally comprises a semi-rigid frame defining an inner collection area and a flexible sheeting at least partially covering the inner collection area. The frame margins may comprise folds that are configured to impart a number of advantages, such as ease of installation, improved collection and/or channeling performance, and aesthetic discreetness. The device may also be made of biodegradable and/or flushable materials, greatly simplifying use and cleaning.

24 Claims, 8 Drawing Sheets

(56) References Cited

U.S. PATENT DOCUMENTS

| | | | | |
|---|---|---|---|---|
| 5,983,410 A * | 11/1999 | Webster | A47K 17/00 | 4/300.3 |
| 6,032,302 A * | 3/2000 | Eckert | A47K 13/24 | 4/300.3 |
| 6,052,840 A * | 4/2000 | West | A47K 13/06 | 4/300.3 |
| 6,085,361 A * | 7/2000 | Whitaker | E03D 11/16 | 4/251.1 |
| 6,357,055 B1 * | 3/2002 | Gambia | A47K 17/00 | 4/300.3 |
| 6,385,785 B1 * | 5/2002 | Linden | A47K 13/24 | 4/300.3 |
| 6,457,188 B1 * | 10/2002 | Lindberg | E03D 11/02 | 4/251.1 |
| 6,470,504 B1 * | 10/2002 | Neuo | E03D 13/00 | 4/301 |
| 6,519,786 B1 | 2/2003 | Francis | | |
| 6,550,075 B1 * | 4/2003 | Brannon, III | A47K 13/24 | 4/300.3 |
| 6,675,803 B1 * | 1/2004 | Edgar | A61F 5/4556 | 128/830 |
| 6,874,171 B2 | 4/2005 | Erves | | |
| 7,178,177 B1 * | 2/2007 | Valencia | A47K 13/24 | 4/300.3 |
| D540,449 S | 4/2007 | Stevenson et al. | | |
| 7,412,732 B1 * | 8/2008 | Leonard | E03D 9/00 | 4/300.3 |
| 7,461,411 B2 * | 12/2008 | Wolf | A47K 13/24 | 4/239 |
| 7,921,478 B1 * | 4/2011 | Vanini | E03D 9/00 | 4/300.3 |
| 7,971,284 B2 * | 7/2011 | Pessel | E03D 9/032 | 4/232 |
| 8,291,525 B2 * | 10/2012 | Pondelick | E03D 11/02 | 4/252.1 |
| 8,719,972 B1 * | 5/2014 | Baker | A47K 11/105 | 4/300.3 |
| 8,856,976 B1 * | 10/2014 | Niedzielski, III | E03D 9/00 | 4/300.3 |
| 8,984,674 B1 * | 3/2015 | Harris | A61F 5/453 | 4/300.3 |
| 9,139,995 B2 * | 9/2015 | Escudero | E03D 9/00 | |
| 9,297,156 B2 * | 3/2016 | Grimaldi | E03D 11/12 | |
| D782,635 S * | 3/2017 | Dick | A61B 90/05 | D23/310 |
| 9,650,778 B2 * | 5/2017 | Danowski | E03D 13/00 | |
| 9,809,964 B1 * | 11/2017 | Williams | E03D 9/00 | |
| 9,809,967 B1 * | 11/2017 | Conrad | A47K 13/00 | |
| 9,918,599 B1 * | 3/2018 | Bensimon | A47K 13/14 | |
| 2004/0231037 A1 * | 11/2004 | Erves | E03D 9/00 | 4/300.3 |
| 2005/0172386 A1 * | 8/2005 | McAleenan, Jr. | A47K 13/24 | 4/300.3 |
| 2005/0193482 A1 * | 9/2005 | Gambia | E03D 9/00 | 4/300.3 |
| 2005/0198727 A1 * | 9/2005 | Conn | A47K 17/00 | 4/300.3 |
| 2006/0041998 A1 * | 3/2006 | Lattanzi | E03D 9/00 | 4/300.3 |
| 2006/0053541 A1 * | 3/2006 | Howard | A47K 13/24 | 4/253 |
| 2009/0211007 A1 * | 8/2009 | Partridge | E03D 9/00 | 4/300.3 |
| 2009/0260142 A1 * | 10/2009 | Fahmie | A47K 13/24 | 4/237 |
| 2009/0320198 A1 * | 12/2009 | Yefremov | A47K 13/24 | 4/300.3 |
| 2009/0320199 A1 | 12/2009 | Stauder | | |
| 2012/0017368 A1 * | 1/2012 | Lostal Grasa | E03D 9/002 | 4/662 |
| 2013/0000027 A1 * | 1/2013 | San Luis | E03D 9/00 | 4/300.3 |
| 2015/0089728 A1 * | 4/2015 | Humphrey, Jr. | A47K 13/302 | 4/233 |
| 2016/0307462 A1 * | 10/2016 | McCarthy | A47K 17/00 | |
| 2016/0369488 A1 * | 12/2016 | Todd, IV | E03D 9/00 | |
| 2018/0238034 A1 * | 8/2018 | Gwen | E03C 1/30 | |
| 2019/0045985 A1 * | 2/2019 | Baker | A47K 13/24 | |
| 2019/0307300 A1 * | 10/2019 | Smith | A47K 13/24 | |
| 2019/0365164 A1 * | 12/2019 | Alex | A47K 13/26 | |

* cited by examiner

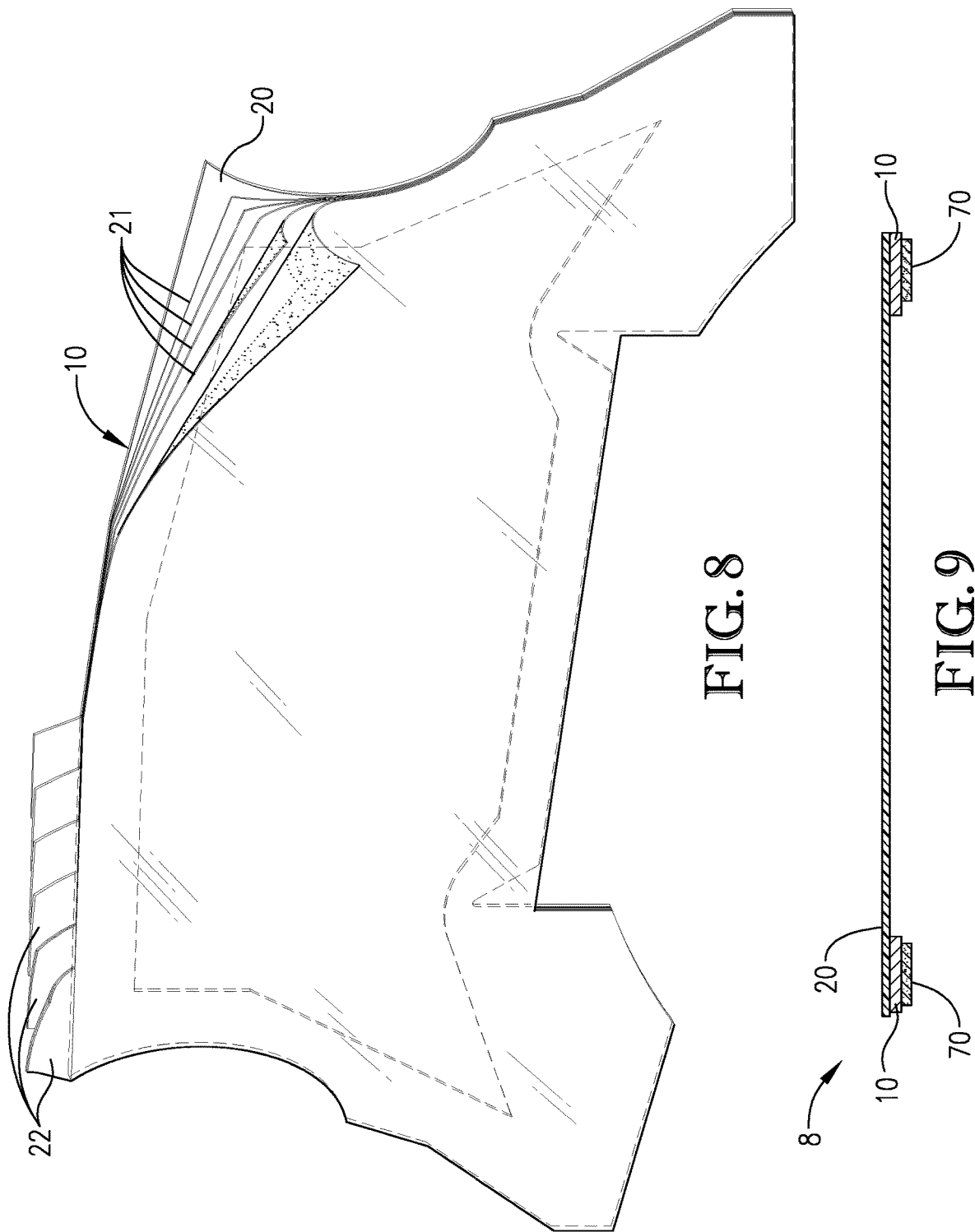

SPLATTER SHIELD FOR TOILET

CROSS-REFERENCE TO RELATED APPLICATIONS

The present application claims the priority benefit of U.S. Provisional Patent Application Ser. No. 62/986,268, filed Mar. 6, 2020, entitled SPLATTER SHIELD FOR TOILET, incorporated by reference in its entirety herein.

BACKGROUND OF THE INVENTION

Field of the Invention

The present invention relates to a urine collection and/or channeling device (a splatter shield device) for use with a toilet that addresses the problem of waste splatter and/or overspray.

Description of Related Art

In many households, toilets are difficult to clean and to keep clean particularly due to the male urination technique. When males stand to urinate, splatter and sometimes spray causes urine to collect and dry in the small cervices of the toilet seat hinges, on the underside of the seat, or on the flat surface of the bowl, and/or to run down the sides of the toilet onto the sides of the toilet bowl and floor. These areas are both difficult and unpleasant to clean, and if urine remains in these areas, permanent damage and stains can remain. The odor can be overpowering and very undesirable, and the presence of waste splatter can allow bacteria to grow.

U.S. Pat. No. 4,348,776 discloses a collapsible splash shield for a toilet. The splash shield is designed to contain splatter, preventing urine from reaching the toilet hinges. However, the design is difficult to clean and install. Its many moving and collapsible parts make it more difficult to clean than the toilet hinges themselves. Additionally, the interior of the toilet bowl itself cannot be properly cleaned without removing the device. Thus, this design is prone to collect and gather urine and/or other waste splatter and grow bacteria.

U.S. Pat. No. 4,912,784 discloses a toilet bowl splash guard. The splash guard is designed to sit on the top of the toilet rim, rather than descending down beyond the rim of the bowl. This can leave splatter and waste to collect under the installed structure, leading to unpleasant odors, bacteria, and continued difficultly in cleaning.

U.S. Pat. No. 5,983,410 discloses a toilet backsplash and overspray shield. The shield is designed to keep urine and/or splatter from reaching the back portion of the toilet, including the hinges. However, the shield would not prevent leakage out the side when folded with the toilet seat. Additionally, the shield does not allow the user to clean the toilet bowl with the device in place. Moreover, the shield requires a "J hook" to secure the device into the toilet. Given that the shield is not disposable, this would be unpleasant to clean.

U.S. Pat. No. 6,385,785 discloses a urine shield for removable attachment to a toilet seat. The shield is designed to keep urine from the back of the toilet seat, but the shield would have to be removed and/or installed every time the seat was raised or lowered. The shield would need to be cleaned on a regular basis and contains small pieces that may be difficult to clean. Additionally, the shield may, in fact, produce more splatter than it contains, as it is made from a rigid material. Moreover, the shield is not discreet.

U.S. Pat. No. 6,519,786 discloses a toilet splash shield system. The system is designed to contain waste that is already in the toilet using a liquid barrier to keep urine and/or other waste in the toilet while flushing. However, the system would only create more splatter if operated when urinating.

U.S. Pat. No. 6,874,171 discloses an overspray shield for a toilet. The shield is designed to block splatter and/or urine from reaching outside the bowl but has several downfalls. For example, the shield relies on semi-permanent or permanent structures to be mounted to the toilet. These structures will collect splatter and need to be cleaned. These structures are also not discreet and can be seen when the toilet seat is both up and down. These structures may even be felt by a user of the toilet when sitting on the seat. The design allows tension to be present when the toilet seat is raised, but it does not have structure that will channel any residual fluid back into the bowl when lowering the seat, and thus waste may spill out the side. Lastly, the toilet bowl cannot be cleaned properly when the device is in place.

U.S. Pat. No. 9,809,964 discloses a urine shield for a toilet. The shield is designed to block splatter and/or urine from reaching outside the bowl, but it has a number of downfalls. For example, the unit is not disposable and is a permanent (or semi-permanent) structure. Additionally, while the self-cleaning housing sits within the toilet, it will need to be cleaned on a regular basis. Moreover, the attachment structures are not discreet and can be seen when the toilet seat is down.

U.S. Design Patent No. D540,449 discloses a toilet seat urine shield. The shield may be designed for eliminating and/or reducing urine and splatter from exiting the toilet from the front of the bowl when the seat is down. However, this unit would have to be dry in order to prevent spreading the urine to the back of the toilet when the lid was raised. Additionally, the device is not designed to eliminate splatter and/or overspray during urination.

United States Patent Application Publication No. 2009/0320199 discloses a containment apparatus for toilets. The apparatus is designed for containing splatter and/or spray when flushing a toilet using a liquid barrier. However, this apparatus would only create more splatter if operated when urinating.

United States Patent Application Publication No. 2013/0000027 discloses a removable, reusable, and flexible urine deflector. The deflector is designed to block splatter from reaching the underside of the toilet seat hinges. However, when the deflector folds, for example when lowering the toilet seat, there is no structure or control to the fold, and any collected splatter would leak out the side of the unit and potentially onto the toilet rim and/or the back of the toilet bowl. The deflector is reusable, so it would also need to be cleaned regularly.

SUMMARY OF THE INVENTION

The present invention is broadly concerned with a urine collection and/or channeling device (a splatter shield device) that overcomes the problems of the previous designs. Specifically, embodiments of the splatter shield device, as described herein, overcome the problem of waste splatter and/or overspray by containing and/or channeling waste back into the toilet bowl itself.

In one embodiment, there is provided a urine collection and/or channeling device for installation on a toilet that comprises a toilet bowl and a toilet seat. The device comprises a semi-rigid frame defining an inner collection area and a flexible sheeting at least partially covering the inner collection area. The frame comprises an upper margin configured to be removably secured to the toilet seat, a lower margin configured to be removably secured to the toilet bowl, and a pair of opposing side margins.

In another embodiment, there is provided a toilet comprising the urine collection and/or channeling device installed thereon.

In another embodiment, there is provided a method of collecting and/or channeling urine overspray and/or splatter. The method comprises installing the urine collection and/or channeling device on a toilet.

BRIEF DESCRIPTION OF THE DRAWINGS

FIG. 8 is a front view of a splatter shield device comprising multiple layers of flexible sheeting in accordance with one embodiment of the present invention; and FIG. 9 is a slice-view of the splatter shield device of FIG. 2 taken across line 9-9.

DETAILED DESCRIPTION

Embodiments of the present invention are generally directed to a urine collection and/or channeling device (a splatter shield device) for installation on bowl-style toilets. The splatter shield device generally comprises a unitary structure, and preferably a collapsible structure, which may have multiple removable or interchangeable components, as described herein. The splatter shield device is configured to reduce splatter, contain overspray, and/or channel waste into the toilet bowl, all while keeping surfaces of the toilet bowl, surrounding floor, and hinges on the toilet seat or lid clean and dry.

Figure 1:
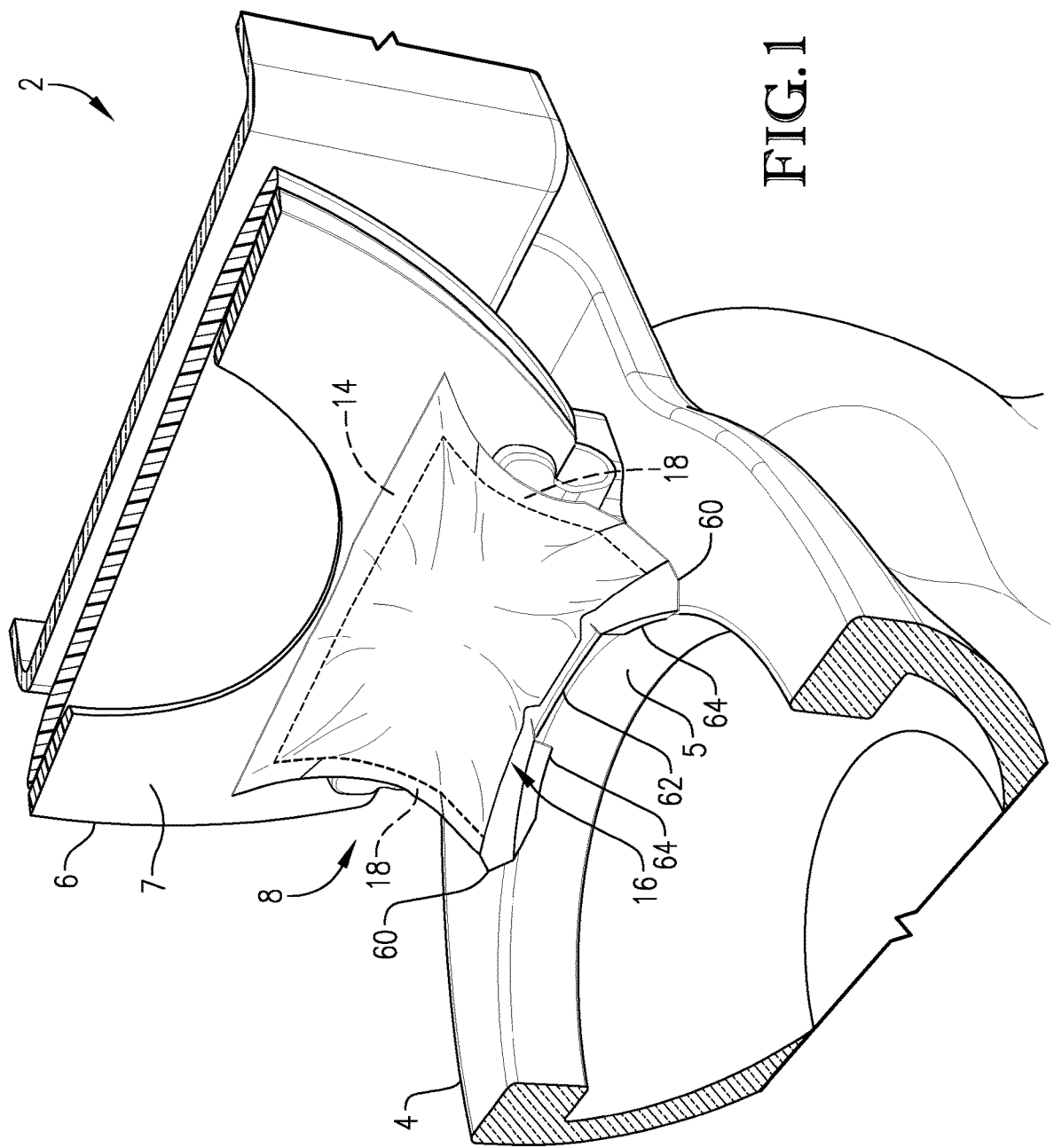
FIG. 1 is a perspective view of a splatter shield device installed on a toilet, with the toilet seat up, in accordance with one embodiment of the present invention.

Referring now to FIG. 1, splatter shield device 8 may be installed onto toilet 2 such that device 8 resides between the underside 7 of toilet seat 6 and the top and/or sides of toilet bowl 4. Specifically, device 8 may be secured to the underside 7 of a toilet seat 6, above the hinges, and to back rim 5 of toilet bowl 4. In one or more embodiments, device 8 can accommodate a variety of toilet seat styles and a variety of toilet bowl styles.

Figure 2:
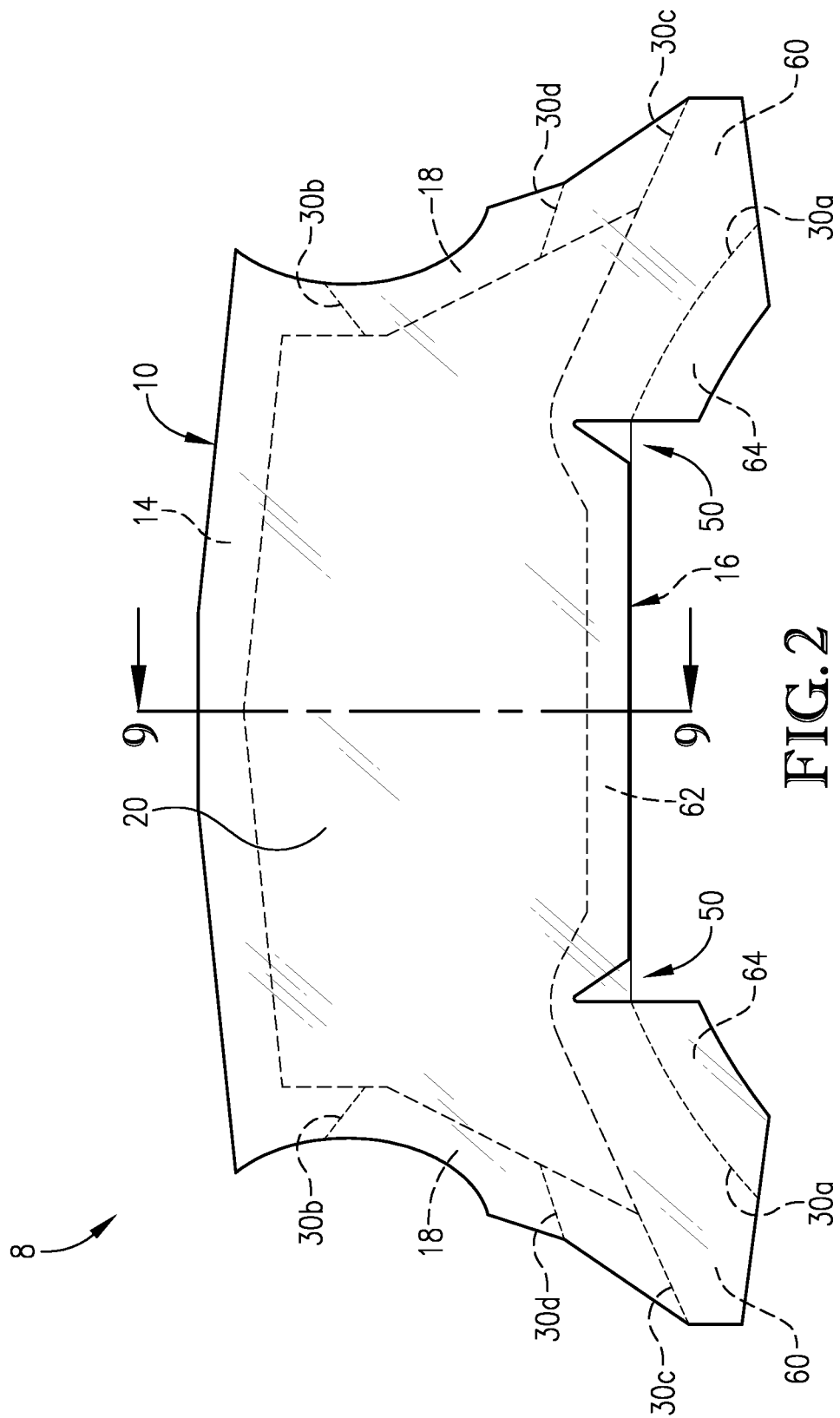
FIG. 2 is a front view of a splatter shield device in accordance with one embodiment of the present invention.
Figure 3:
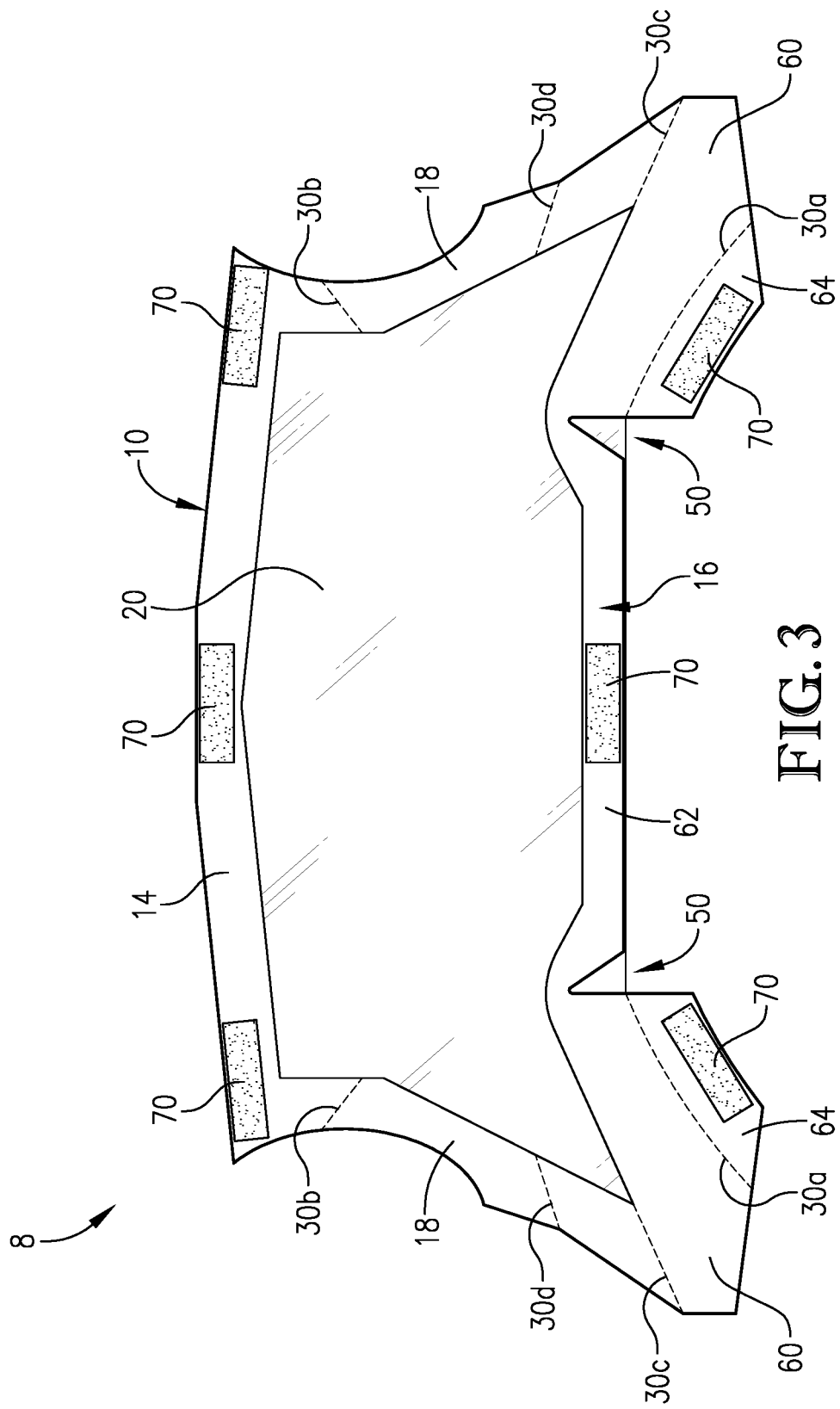
FIG. 3 is a rear view of a splatter shield device in accordance with one embodiment of the present invention.
Figure 4:
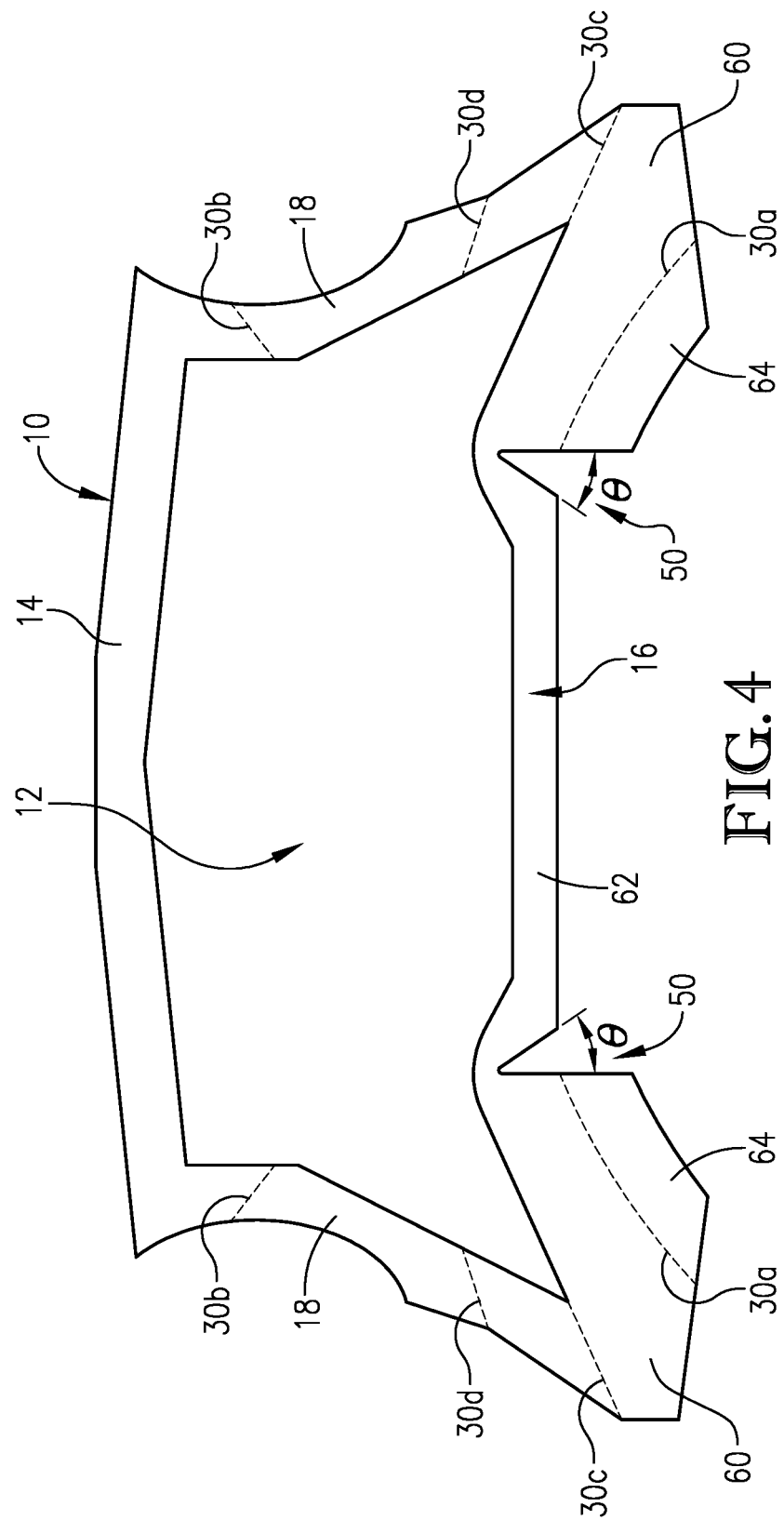
FIG. 4 is a front view of a frame for a splatter shield device in accordance with one embodiment of the present invention.

FIG. 2 shows splatter shield device 8 from the front side (i.e., from the side that faces toward the toilet bowl and user upon installation). FIG. 3 shows splatter shield device 8 from the back side (i.e., from the side that faces, and is secured to the toilet, upon installation). As shown, splatter shield device 8 generally comprises a frame 10, the margins of which define a collection area 12 within the boundaries of frame 10 (See FIG. 4), and flexible sheeting 20 at least partially covering collection area 12. As shown in FIGS. 2 and 3, in certain preferred embodiments, sheeting 20 spans across, and entirely covers, collection area 12. In certain preferred embodiments, sheeting 20 at least partially, or entirely (as shown), covers the front surface of frame 10.

Frame 10 is generally configured to create and/or maintain tension on flexible sheeting 20, and to hold a firm shape to the outer edge of the shield device 8, thus channeling waste back into the toilet bowl and/or preventing waste from spilling out the sides onto the toilet. Frame 10 generally has a semi-rigid structure and comprises upper margin 14, lower margin 16, and a pair of opposing side margins 18. As shown in FIG. 1, lower margin 16 is configured to be removably secured to rim 5 of toilet bowl 4, while upper margin 14 is configured to be removably secured to underside 7 of toilet seat 6. Frame 10 is constructed so as to contour to the shape of the toilet bowl 4 and/or underside 7 of toilet seat 6. The contoured shape of frame 10 advantageously allows for more coverage while still maintaining the discreet character of device 8, as discussed in greater detail below.

Frame 10 generally comprises a solid yet flexible material. In certain embodiments, frame 10 comprises a material selected from the group consisting of plastics, bioplastics, papers, cardboards, wood, composites, metals, and mixtures thereof. In certain embodiments, frame 10 comprises poster board or paper material, which is more environmentally-friendly than other materials. Frame 10 is configured to be flexible enough to curve to the shape of the rim 5 of toilet bowl 4 and underside 7 of toilet seat 6, yet maintain a rigid enough structure to maintain consistent movement and/or shape of splatter shield device 8, as well as to channel overspray back into the toilet.

In certain embodiments, lower margin 16 of frame 10 comprises a pair of opposing lower corner segments 60 and center segment 62. In certain embodiments, center segment 62 may be configured to at least partially extend over the edge of rim 5 of bowl 4. In certain same or other embodiments, center segment 62 may be configured to at least partially extend into, and/or be secured to the back surface of, rim 5. Such configurations advantageously improve the channeling of collected overspray and/or splatter into the bowl with minimal residual collection above the rim.

In certain embodiments, lower margin 16 comprises a pair of notches or recesses 50 formed therein positioned between and at least partially separating corner segments 60 from center segment 62. Advantageously, recesses 50 are configured to provide flexibility to lower margin 16 of frame 10 for installation on a variety of toilet bowl (and rim) shapes, including round, elongated, and/or other shapes of various dimensions. Thus, recesses 50 allow device 8 to contour to any number of bowls seamlessly. As best shown in FIG. 3, recesses 50 may have a wedge shape, with the angle (θ) between center segment 62 and corner segments 60 being about 10° to about 75°, about 20° to about 60°, or about 30° to about 45°. In certain embodiments, sheeting 20 at least partially, or entirely, covers one or both of recesses 50, as shown.

In certain embodiments, lower margin 16 further comprises tabs 64 extending from corner segments 60. Tabs 64 are configured to extend into, and be secured to, rim 5 of toilet bowl 4. In certain embodiments, tabs 64 further comprise folds 30a that allow tabs 64 to be easily positioned and installed on rim 5. As used herein, the term "folds" refers to pre-creased bends in frame 10, for example as illustrated in the figures, as well as hinges or other flexible or rotatable joints (i.e., comprising the permanent or semi-permanent joinder of separate frame segments). As illustrated, when device 8 is installed, folds 30a are configured such that tabs 64 will generally have a different plane than corner segments 60. That is, tabs 64 extend into rim 5 of bowl 4, while the rest of corner segments 60 reside above rim 5.

Figure 5:
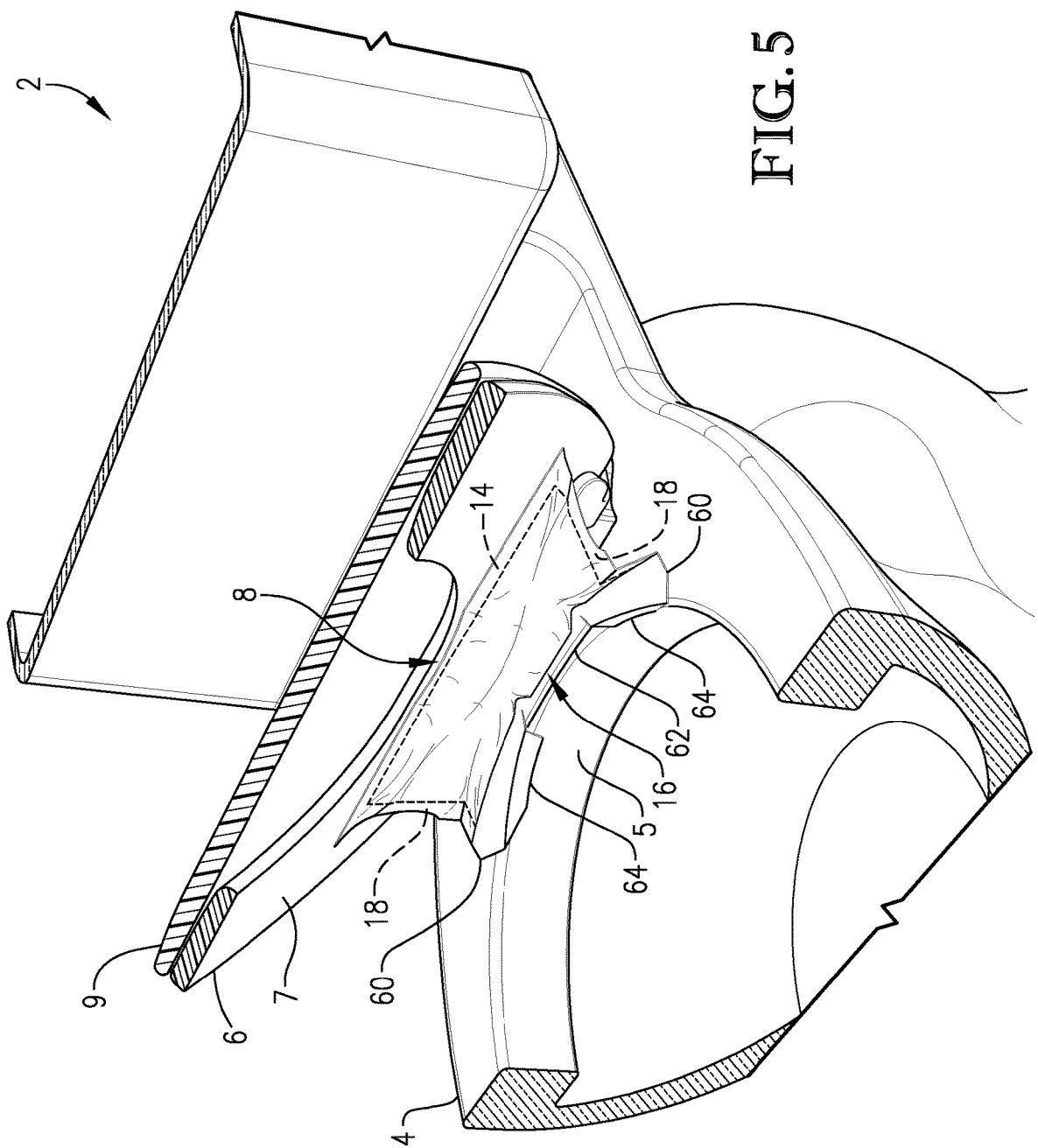
FIG. 5 is a perspective view of a splatter shield device installed on a toilet, with the toilet seat partially open, in accordance with one embodiment of the present invention.
Figure 6:
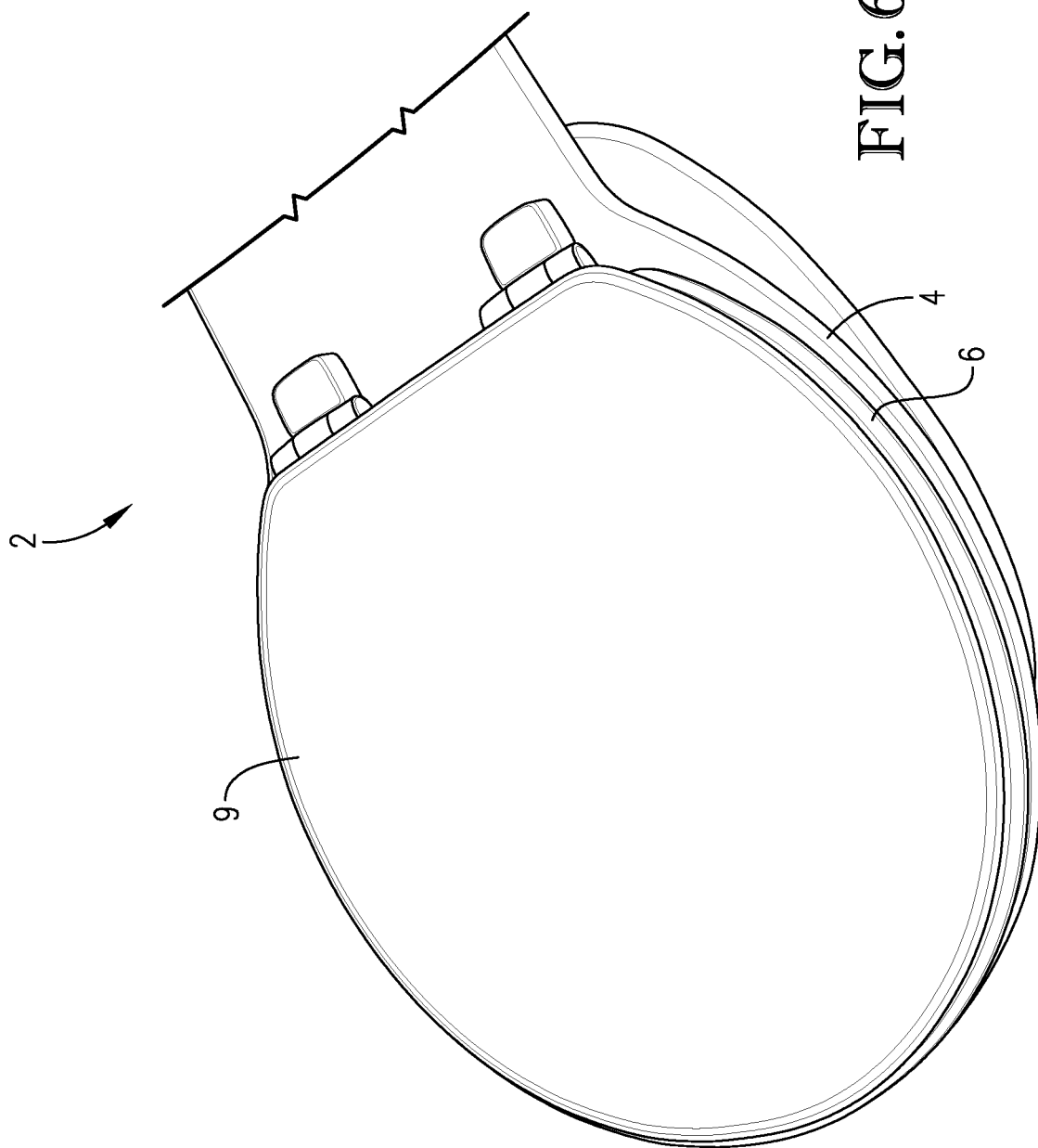
FIG. 6 is a perspective view of a splatter shield device installed on a toilet, with the toilet seat and lid down, in accordance with one embodiment of the present invention.

In certain embodiments, each of side margins 18 comprises a plurality of folds 30b, 30c, 30d formed therein. As with folds 30a, described above, folds 30b, 30c, 30d of side margins 18 may be pre-creased bends, hinges, and/or other flexible or rotatable joints. Regardless the construction, folds 30b, 30c, 30d should be capable of predictably and consistently bending, flexing, or rotating side margins 18 during opening and collapsing of device 8 when raising and lowering toilet seat 6. As best shown in FIG. 5, folds 30b, 30c, 30d are generally constructed so as to impart a zig-zag (accordion) shape to side margins 18 while device 8 is being collapsed or opened when toilet seat 6 is lowered or raised. In certain embodiments, each side margin 18 comprises two or more inward folds 30b, 30c (i.e., the edge of the fold points toward the back of the toilet or toilet seat when the toilet seat is closed and device 8 is collapsed). In certain embodiments, each side margin 18 comprises one or more outward folds 30d (i.e., the edge of the fold points toward the front of the toilet or toilet bowl when the toilet seat is closed and device 8 is collapsed). As shown, in certain embodiments, folds 30b, 30c, 30d may be non-parallel to one or more of the other folds 30b, 30c, 30d, which can advantageously allow for device 8 to remain discreet when toilet seat 6 is in the lowered position (see FIG. 6). For example, in certain embodiments, when said toilet seat 6 and/or toilet lid 9 are in the lowered position, the device 8 is not visible to a user when viewed from above.

Flexible sheeting 20 is generally configured to collect urine splatter and/or overspray in collection area 12 and channel the splatter and/or overspray into toilet bowl 4. Moreover, in certain embodiments, the flexible structure of sheeting 20 can reduce the impact of the splatter and/or overspray stream. That is, flexible sheeting 20 provides elasticity and/or absorbency of the stream pressure of the urine or other liquid, thus reducing or eliminating further areas of splatter impact.

Flexible sheeting 20 can be secured to frame 10 in a variety of configurations. As shown in FIG. 2, in certain embodiments, sheeting 20 is adhered or otherwise affixed to the front face of frame 10 and may partially or completely cover frame 10 to provide a flexible yet impervious surface operable to contain, channel, and/or or absorb fluid waste. Flexible sheeting 20 may be affixed to frame 10 in other ways, which may employ folds, flaps, draping, overlapping, and combinations thereof, so long as the sheeting 20 at least partially, or completely covers the collection area 12 within frame 10.

Flexible sheeting 20 generally comprises a pliable material, which may be selected so as to provide a smooth and/or elastic surface to absorb the impact of an overspray stream, thereby reducing splatter. Flexible sheeting 20 may comprise a variety of impervious and/or absorbent materials. In certain embodiments, flexible sheeting 20 comprises paper-based, plastic (e.g., polyethylene), and/or bioplastic materials, although other flexible materials may be used. A paraffin coating or other impervious coating may be applied to the surface of flexible sheeting 20, which may provide improved collection and channeling performance.

As noted above, frame 10 generally comprises semi-rigid material(s), while flexible sheeting 20 generally comprises pliable material(s). Thus, in certain embodiments, frame 10 comprises a different material than sheeting 20. The different materials may include different species of the same category of material (i.e., different plastics, different bioplastics, different paper-based materials, etc.) In certain same or other embodiments, the thickness and/or density of frame 10 is greater than the thickness and/or density of flexible sheeting 20. In certain embodiments, frame 10 has a thickness that is at least about 2 times greater, at least about 5 times greater, or at least about 10 times greater than the thickness of flexible sheeting 20. In certain embodiments, frame 10 has a thickness that is about 2 times greater to about 100 times greater, about 5 times greater to about 50 times greater, or about 10 times greater to about 25 times greater than the thickness of flexible sheeting 20. In certain embodiments, frame 10 comprises a material different than the material of flexible sheeting 20.

Figure 7:
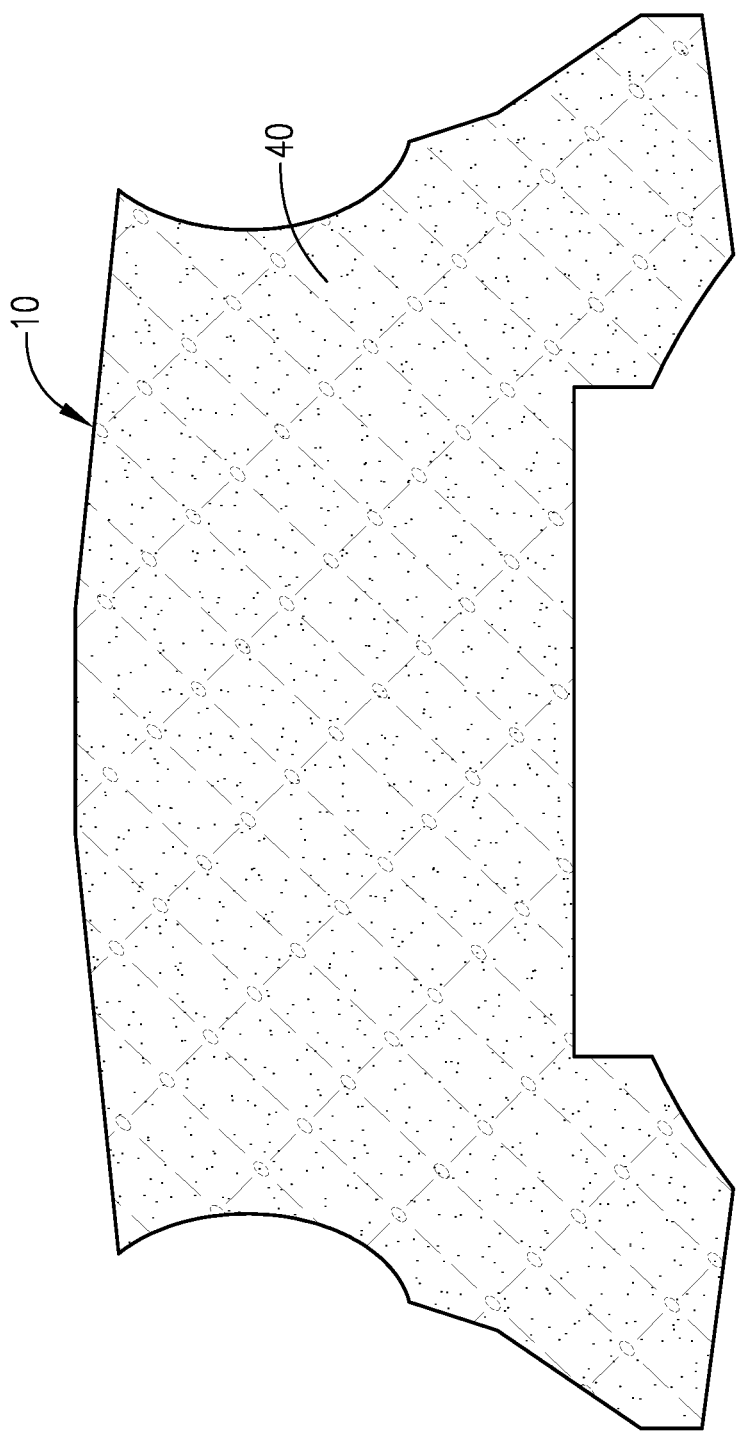
FIG. 7 is a front view of a splatter shield device comprising an absorbent padding material in accordance with one embodiment of the present invention.

In certain same or other embodiments, flexible sheeting 20 may comprise a layer of padding or absorbent material. The padding or absorbent layer 40 may be added, for example, to the front surface of an impervious flexible sheeting 20, or the padding or absorbent layer may be the flexible sheeting (i.e., instead of an impervious sheeting material) and secured to the front surface of frame 10, as shown in FIG. 7. Regardless, the padding or absorbent layer is advantageously configured to absorb the shock of overspray, thereby reducing splatter, and/or to capture splatter and prevent or reduce drippage when removing the splatter shield device from the toilet. In certain embodiments, the padding layer is non-absorbent, allowing the user to dispose of the pad-shield to reduce the need to clean and/or sanitize the apparatus and/or protected areas. In certain other embodiments, the padding layer is absorbent, allowing liquids to be collected and thereby discarded. In certain embodiments, the padding layer comprises both absorbent and non-absorbent sections, or may be more or less absorbent to address higher volumes of contaminates that contact the device. The padding or absorbent layer may comprise multiple sheets or layers, thus allowing the user to remove just one pad at a time. The absorbent layer may be attached to the frame or underlying flexible sheeting by a variety of mechanisms, including but not limited to, adhesives, hook-and-loop (e.g., Velcro device), friction between the texture of the padding and the adjacent fixture, clip, and/or lip, or a combination of mechanisms.

In certain same or other embodiments, the flexible sheeting and/or padding layer(s) may comprise multiple sheets, which can be stacked or layered so as to allow for the end user to dispose of a single layer of sheeting or padding before removing the entire device. For example, as shown in FIG. 8, in certain such embodiments, the splatter shield device may comprise two or more layers 21 of flexible sheeting affixed to frame 10 or base sheeting 20, allowing the user to remove a layer and only dispose of one sheet at a time until all sheets had been used. The user would then be able to replace or refill the device with a new stack of layered flexible sheeting and/or padding. In certain embodiments, the stack of layered flexible sheeting and/or padding may comprise tabs 22, which are configured to allow the user to easily remove and replace at least one layer of sheeting and/or padding, or the entire stack. As shown in FIG. 8, tabs 22 of the layers 21 can be positioned adjacent upper margin 14 in a staggered arrangement (similar to file folders) so as to ease the removal of an individual layer 21. Tabs 22 are generally positioned on the outer edges toward one or both of side margins 18. Tabs 22 are generally not present in the middle of sheet layers 21 adjacent upper margin 14, as such tabs would be visible when toilet seat 6 is in the lowered position. In certain embodiments, tabs 22 are positioned on the outer five inches, outer four inches, or outer three inches of one or both sides of the upper edge of sheet layers 21. This positioning of tabs 22 allows the user to remove individual layers 21 without touching portions that have been heavily subjected to overspray and/or splatter. In certain embodiments, the flexible sheeting and/or padding can be made of flushable and/or biodegradable material(s), thereby allowing the user to simply remove and flush the removable layer of sheeting and/or padding.

The splatter shield device may be installed on a toilet by attaching and securing the device in a number of ways. For example, the device may be attached and secured using adhesives, hook and loop (e.g., Velcro), stationary and/or malleable clips, and/or tensioning mechanisms. In certain embodiments, an adhesive is used, which is preferably waterproof, durable, and/or removes without leaving residue on wood, porcelain, and/or plastic surfaces. Exemplary adhesives include 300LSE and 410M by 3M. Other adhesives or attachment mechanisms, including but not limited to buckles, snaps, hoop and loop, clips, tension, magnets, and/or texture, may also be used. Other attachment mechanisms, devices, and/or methods may also be used within the scope of the present invention. Regardless the mechanism, in certain embodiments, installation of the splatter shield device 8 generally comprises securing at least a portion of the upper margin 14 of frame 10 to underside 7 of toilet seat 6 and/or securing at least a portion of the lower margin 16 of frame 10 to rim 5 of toilet bowl 4.

Referring again to FIG. 3, splatter shield device 8 may comprise one or more adhesive strips 70 affixed to the back side of frame 10 (see also FIG. 9). Adhesive strips 70 are preferably waterproof, semi-permanent, and/or double-sided (e.g., double-sided adhesive tape). The placement of adhesive strips 70 (or any attachment mechanism) should be selected to provide appropriate tension support, particularly on the flexible sheeting material, and to allow appropriate movement while raising and lowering the toilet seat and during use. As shown in FIG. 3, one or more adhesive strips 70 may be positioned across upper margin 14 to secure upper margin 14 of device 8 to underside 7 of toilet seat 6, and/or one or more adhesive strips 70 may be positioned on tabs 64 of corner segments 60 and on central segment 62 to secure lower margin 16 of device 8 to rim 5 of toilet bowl 4.

Embodiments of the present invention are also directed to methods of collecting and/or channeling urine (i.e., overspray and/or splatter) into a toilet bowl. In use, the splatter shield device is configured to provide necessary tension on the flexible sheeting material to channel fluid into the toilet bowl, while still maintaining some flexibility or elasticity reduce the impact (and excess splatter) of fluid. When installed on the toilet bowl rim and underside of the toilet seat, as described herein, the toilet seat may be raised and lowered, thereby expanding (opening) and collapsing (closing) the splatter shield device. In certain embodiments, due at least in part to the zig-zag and/or non-parallel construction of the side margin folds, the expansion can occur across multiple axes or directions, thereby providing maximal coverage. Additionally, in certain embodiments, the angles and positioning of the folds are advantageously configured to elevate the side margins of the frame when the toilet seat is down, thus eliminating any side leakage and channeling any fluid into the toilet bowl. Moreover, when the flexible sheeting material comprises an absorbent material, fluid may also be inhibited or prevented from diverting outside the toilet bowl when the toilet seat is closed, for example, by trapping and/or holding the liquid in the absorbent material.

As described herein, the splatter shield device may comprise one or more components that are biodegradable, flushable, or otherwise disposable. Thus, in certain embodiments, the methods further comprise flushing or disposing of at least a portion of the device. For example, in certain embodiments, when the device comprises multiple layers of flexible sheeting and/or padding material, a top layer of flexible sheeting and/or padding material may be removed, flushed, and/or otherwise disposed of, thereby exposing a clean layer of flexible sheeting and/or absorbent material. In certain same or other embodiments, the entire device may be removed, flushed, and/or otherwise disposed of, and a new device may be installed on the toilet.

The splatter shield device may be manufactured using any number of processes and materials. In a particular embodiment, the splatter shield can be manufactured using a four step process. First, one or more dies are used to cut the inner structure of frame and to score the folds. This process can result in a roughly 14 inch by 7 inch frame structure with scored folds. Second, an adhesive is applied (e.g., sprayed) onto the face of the frame, and the flexible sheeting is adhered to the face. Third, one or more dies are used to cut the outer edge of the frame and sheeting, ensuring a smooth edge and finished cut product. Finally, strips of double-sided tape are positioned and adhered to the back surface of the frame.

In another particular embodiment, the splatter shield may be manufactured using a mold. For example, a plastic mold can be used to contour and form the frame border and a thinner, more flexible and/or elastic material as the sheeting covering the collection area. Double sided tape and/or other adhesive or attachment mechanism can then be positioned and secured to the back of the frame.

In certain embodiments, the splatter shield device may be constructed to be disposable and/or biodegradable. For example, in certain embodiments, biodegradable materials may be used for the frame, flexible sheeting, padding, and/or adhesives, and may include biodegradable plastics, paper, and/or coating materials. Additionally, in certain embodiments, the frame, flexible sheeting, padding, and/or adhesives may be made from recycled materials. In certain embodiments, the components of the splatter shield device may comprise both biodegradable and non-biodegradable components. Advantageously, the use of biodegradable components may permit the splatted shield device to be flushable according to various laws and ordinances. In certain embodiments, the splatter shield device is made entirely of biodegradable components.

In certain embodiments, the splatter shield device can be treated with scent or odor elimination chemicals. In certain embodiments, the splatter shield device, or any single component, may be treated with a chemical to only produce a scent and/or eliminate odors when reacting to a liquid substance. In certain embodiments, the splatter shield device can be scented out of the package.

In certain embodiments, the splatter shield device, and particularly the flexible sheeting material may be treated with anti-bacterial cleaning agent. Particularly preferred cleaning agents will activate when wet, thereby neutralizing urine on contact and/or dripping into the toilet bowl, thus eliminating some bacteria between full cleanings and reducing bacteria in the toilet area.

In certain embodiments, the splatter shield can have an image, logo, wording, or other design imposed thereon. For example, when a thin polyethylene or similar material is used for the flexible sheeting, a design can be printed thereon using known techniques.

The splatter shield device and methods according to embodiments of the present invention have a number of advantages over existing devices, systems, and methods. For example, the splatter shield device comprises a single, self-contained unit configured to ensure splatter and overspray are contained within the toilet. The device is also easy to install, can be quickly removed and disposed, and leaves behind no residue. Moreover, the splatter shield device does not alter the toilet's method of use. Once installed, the unit remains in place without needing to be moved or replaced before or after using the toilet. The toilet bowl can even be cleaned with the device installed. The device may be disposable, requiring no cleaning, but can also be used long term. For example, once installed, the device may be effective for weeks or longer, depending on user preference and toilet use. The device does not require the installation or use of permanent or semi-permanent hardware.

The design of the splatter shield device also imparts a number of desirable characteristics that are not recognized or appreciated by previous designs. For example, the splatter shield is discreet and is virtually unnoticeable when the toilet seat is down. Additionally, the device is flexible enough to be uniquely curved to contour to the shape of the back of the toilet while providing as much coverage as possible when the seat is upright yet is still discreet when folded. Moreover, the design allows the frame to fold yet maintain a rigid edge and contain waste, while the flexibility of the sheeting makes folding the unit discreet and reduces splatter due to its flexible, elastic properties. Thus, the splatter shield device is designed to be used on both elongated bowls and standard bowls of various geometries and sizes. The recesses in the lower margin of the frame allow for variance during installation. Thus, users with elongated toilets can fit the splatter shield more tightly.

Unlike some prior designs, the splatter shield is designed to eliminate leakage from the side and quickly direct and channel overspray and fluids directly into the toilet bowl. Moreover, the splatter shield requires no long-term installation and/or hardware, and can, for example, be used once or repeatedly for years without any hardware designed to be used for the long term. Advantageously, the splatter shield can be made biodegradable and/or flushable materials, making the device easier for the user.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

I claim:

1. A urine collection and/or channeling device for installation on a toilet, said toilet comprising a toilet bowl and a toilet seat, said device comprising:
a semi-rigid frame defining an inner collection area and comprising an upper margin configured to be removably secured to said toilet seat, a lower margin configured to be removably secured to said toilet bowl, and a pair of opposing side margins, each of said side margins comprising a plurality of non-parallel and unevenly spaced folds formed therein; and
a flexible sheeting at least partially covering said inner collection area.

2. The device of claim 1, wherein said plurality of folds comprises two or more inward folds and one or more outward folds configured to bend, flex, or rotate said side margins when lowering or raising said toilet seat and to channel fluid toward the toilet bowl when said toilet seat is lowered.

3. The device of claim 1, wherein said lower margin comprises a pair of corner segments, a central segment, and a pair of recesses each positioned between said pair of corner segments and said central segment.

4. The device of claim 1, wherein said lower margin comprises a pair of tabs extending therefrom and configured to be secured to a rim of said toilet bowl.

5. The device of claim 1, further comprising one or more adhesives positioned on a back surface of said upper margin and configured to removably secure said upper margin to said toilet seat, and one or more adhesives positioned on a back surface of said lower margin and configured to removably secure said lower margin to said toilet bowl.

6. The device of claim 1, wherein the flexible sheeting comprises a material selected from the group consisting of paper products, plastics, bioplastics, and/or paraffin-coated materials.

7. The device of claim 1, wherein said flexible sheeting comprises at least one layer of an impervious material and/or at least one layer of an absorbent material.

8. The device of claim 7, wherein said flexible sheeting comprises two or more removeable layers of said impervious material and/or two or more removeable layers of said absorbent material.

9. The device of claim 7, wherein said flexible sheeting further comprises a tab extending therefrom and configured to allow a user to remove at least one layer of said impervious material and/or at least one layer of said absorbent material.

10. The device of claim 1, wherein said frame comprises a material selected from the group consisting of plastics, bioplastics, papers, cardboards, wood, composites, metals, and mixtures thereof.

11. The device of claim 1, wherein said frame comprises a different material than said flexible sheeting.

12. The device of claim 1, wherein said frame has a thickness and/or density that is greater than the thickness and/or density of said flexible sheeting.

13. A toilet comprising the urine collection and/or channeling device of claim 1 installed thereon.

14. The toilet of claim 13, wherein said upper margin of said frame is removably secured to said toilet seat, and wherein said lower margin of said frame is removably secured to said toilet bowl.

15. The toilet of claim 13, wherein when said toilet seat is in the lowered position, said device is not visible to a user when viewed from above.

16. A method of collecting and/or channeling urine overspray and/or splatter, said method comprising installing the urine collection and/or channeling device of claim 1 on a toilet.

17. The method of claim 16, wherein the installing comprises removably securing said upper margin of said frame to said toilet seat and removably securing said lower margin of said frame to said toilet bowl.

18. The method of claim 16, further comprising lowering said toilet seat, thereby collapsing said device and channeling at least a portion of any fluid collected in said device into said toilet bowl.

19. The method of claim 16, further comprising flushing or otherwise disposing of at least a portion of said device.

20. The method of claim 19, wherein said flexible sheeting comprises two or more removeable layers of an impervious material and/or two or more removeable layers of an absorbent material, said method further comprising removing and/or flushing a top layer of said flexible sheeting, thereby exposing a clean layer of said flexible sheeting.

21. A urine collection and/or channeling device for installation on a toilet, said toilet comprising a toilet bowl and a toilet seat, said device comprising:
a semi-rigid frame defining an inner collection area and comprising an upper margin configured to be removably secured to said toilet seat, a lower margin configured to be removably secured to said toilet bowl, and a pair of opposing side margins, wherein said lower margin comprises a pair of corner segments, a central segment, and a pair of recesses each positioned between said pair of corner segments and said central segment; and
a flexible sheeting at least partially covering said inner collection area.

22. A urine collection and/or channeling device for installation on a toilet, said toilet comprising a toilet bowl and a toilet seat, said device comprising:
a semi-rigid frame defining an inner collection area and comprising an upper margin configured to be removably secured to said toilet seat, a lower margin configured to be removably secured to said toilet bowl, and a pair of opposing side margins; and
a flexible sheeting at least partially covering said inner collection area and comprising two or more removeable layers of impervious material and/or two or more removeable layers of absorbent material.

23. A urine collection and/or channeling device for installation on a toilet, said toilet comprising a toilet bowl and a toilet seat, said device comprising:
a semi-rigid frame defining an inner collection area and comprising an upper margin configured to be removably secured to said toilet seat, a lower margin configured to be removably secured to said toilet bowl, and a pair of opposing side margins; and
a flexible sheeting at least partially covering said inner collection area and comprising at least one layer of an impervious material and/or at least one layer of an absorbent material, said flexible sheeting further comprising a tab extending therefrom configured to allow a user to remove at least one layer of said impervious material and/or at least one layer of said absorbent material.

24. A method of collecting and/or channeling urine overspray and/or splatter, said method comprising:
installing a urine collection and/or channeling device on a toilet comprising a toilet bowl and a toilet seat, said device comprising:
a semi-rigid frame defining an inner collection area and comprising an upper margin configured to be removably secured to said toilet seat, a lower margin configured to be removably secured to said toilet bowl, and a pair of opposing side margins, and
a flexible sheeting at least partially covering said inner collection area and comprising two or more removeable layers of an impervious material and/or two or more removeable layers of an absorbent material; and
removing and/or flushing a top layer of said flexible sheeting, thereby exposing a clean layer of said flexible sheeting.

\* \* \* \* \*